United States Patent [19]

Hayashi

[11] Patent Number: 5,592,576
[45] Date of Patent: Jan. 7, 1997

[54] SCANNING APPARATUS HAVING A DOUBLE SIDE SCANNER AND METHOD FOR CONTROLLING THE SCANNER

[75] Inventor: Masahiro Hayashi, Yokohama, Japan

[73] Assignee: Ricoh Company, Ltd., Tokyo, Japan

[21] Appl. No.: 308,267

[22] Filed: Sep. 19, 1994

[30] Foreign Application Priority Data

Dec. 20, 1993 [JP] Japan .................................. 5-319351

[51] Int. Cl.⁶ .............................. G06K 9/00; G03B 27/32
[52] U.S. Cl. ........................ 382/318; 382/319; 355/23; 355/24
[58] Field of Search ........................... 358/496; 382/318, 382/319; 348/362, 364; 235/440; 355/23, 24

[56] References Cited

U.S. PATENT DOCUMENTS

| | | | |
|---|---|---|---|
| 3,941,982 | 3/1976 | Knollenberg et al. | 235/92 DP |
| 4,110,737 | 8/1978 | Fahey | 340/146.3 |
| 4,302,775 | 11/1981 | Widergren et al. | 358/136 |
| 4,949,189 | 8/1990 | Ohmori | 358/496 |
| 5,136,665 | 8/1992 | Inoue | 382/318 |

FOREIGN PATENT DOCUMENTS 63-138362  6/1988  Japan .
5-120468  5/1993  Japan .

*Primary Examiner*—Leo Boudreau
*Assistant Examiner*—Monica S. Davis
*Attorney, Agent, or Firm*—Oblon, Spivak, McClelland, Maier & Neustadt, P.C.

[57] ABSTRACT

A double side scanner and method for controlling the scanner. While each of the two scanners of the double side scanner require its own scanning parameters, a user is only required to input one set of parameters for the first side and the second side parameters can be determined from the first side parameters. The second side parameters can be copied from the first side parameters or a transformation process may be performed on the first side parameters in order to obtain the second side parameters. The transformation process can include the changing of margins to account for a binding margin and the changing of the darkness of the scan depending upon the variation of the sensitivities of the light detector of each of the scanners. In order to reduce the amount of time for the scanning process, it is possible to transfer information contained within an image memory to a storage memory at the same time as additional scanning data is being obtained. An error check can also be performed to determine if an overflow condition exists within the image memory.

23 Claims, 6 Drawing Sheets

SCANNING APPARATUS HAVING A DOUBLE SIDE SCANNER AND METHOD FOR CONTROLLING THE SCANNER

BACKGROUND OF THE INVENTION

1. Field of the Invention

This invention generally relates to a scanning apparatus such as an electrical filing system, an optical filing system, a facsimile, a copier, or a digital copier having a double side scanner, and a method for controlling the scanner. The invention is more particularly related to control parameters which control the operation of two scanners which are part of the double side scanner and which perform a scanning operation of a single sheet at the same or approximately the same time.

2. Discussion of the Background

Generally, some scanning apparatuses such as electrical filing systems, optical filing systems, facsimiles, copiers, and digital copiers perform double sided scanning of a document. One style of scanners uses a single scanner and scans different sides of a page at different times. This type of scanner is disclosed in Japanese Laid-Open Patent Publication No. 138362/1988.

Another type of scanner utilizes two scanners (e.g. a double side scanner) and the scanners scan each side of a single page at approximately the same time. The scanning apparatus incorporating a double side scanner has an advantage of a higher scanning speed than the scanner apparatus having one scanner. This type of scanner is disclosed in Japanese Laid-Open Patent Publication No. 120468/1993.

However, typical double side scanners treat each of the two scanners separately; that is, the scanning parameters for one of the two scanners must be separately input from the parameters of the scanner for the other side of the page. This can result in a complex entry procedure and may bring about errors during the entry of the scanning parameters.

SUMMARY OF THE INVENTION

It is therefore an object of the present invention to provide a scanning apparatus such as an electrical filing system, an optical filing system, a facsimile, a copier, or a digital copier having a double side scanner for scanning each side of a page of a document including a business card. It is another object of the invention to provide a method for controlling the scanning apparatus having a double side scanner by setting the scanning parameters of a second side of a sheet using scanning parameters and conditions of a first side of the sheet.

These and other objects are accomplished using a double side scanner which required the inputting of scanning parameters for only one side of a sheet. The parameters for the first side may be directly copied to the parameters used for the second side of a sheet. Alternatively, the parameters for the second side of the sheet can be a modification of the parameters of the first side of the sheet. For example, pages may be scanned which have a binding margin and therefore, the left margin of the front side of a page will be different from the left margin of the backside of the page but be the same as the right margin of the backside of the page. The present invention can automatically handle transformation of these parameters. Additionally, if the image pick-up sensor for one scanner has a different sensitivity than the image pick-up of the other scanner, when one specific darkness is set to be used for each scanner, the sensitivity of the image pick-ups can be compensated for in order to produce uniform scans.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
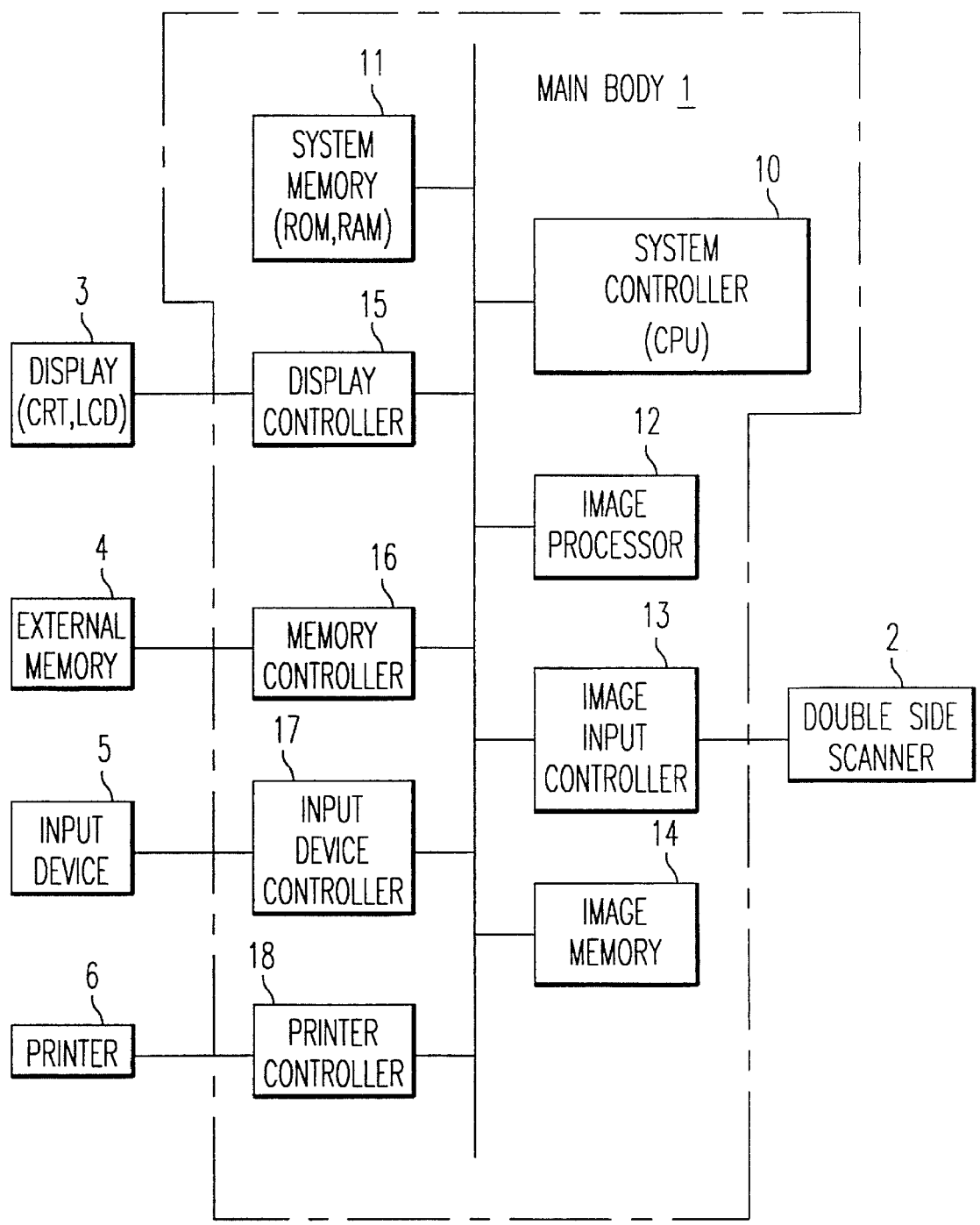
FIG. 1 is a block diagram showing a scanning apparatus such as a filing apparatus according to the present invention.

Referring now to the drawings, wherein like reference numerals designate identical or corresponding parts throughout the several views, and more particularly to FIG. 1 thereof, there is illustrated a scanning apparatus such as a filing system used by the present invention. It is to be understood that the scanner, control system, and method of the invention can be incorporated into any type of device requiring a scanner. The scanning apparatus includes a main body 1, a double side scanner 2, a display 3, an external memory 4, such as an optical disk drive, an operation input device 5, such as a keyboard or a mouse, etc., and a printer 6.

The main body 1 includes primarily a system controller 10 which includes a CPU, a system memory 11 including memory such as RAM or ROM, an image processor 12, an image input controller 13, an image memory 14, a display controller 15, a memory controller 16, an input device controller 17, and a printer controller 18.

The system controller 10 includes a CPU and controls the system by executing a program stored in the ROM, for example, and uses a RAM as a working memory during processing. The image processor 12 processes image data in the image memory 14 for purposes of correction, enlargement, reduction, rotation, etc. The image input controller 13 inputs data of a document scanned by the double side scanner 2 and controls temporary storage of the image memory 14. The image input controller 13 and/or system controller 10 assist in the use of the first side scanning parameters in the scanning of the second side. The image input controller 13 includes a SCSI controller and a DMA controller, for example. The image input controller 13 also controls scaling of image data scanned by the double side scanner. The image memory 14 temporarily contains stored image data from the image input controller 13. This image data is eventually transferred to a permanent memory such as a hard disk or optical disk. The display controller 15 controls displaying of image data and operation information on the display 3. The memory controller 16 controls the reading of image data temporarily stored in the image memory and controls movement of this data to external memory 4. The input device controller 17 receives data from the input device 5 and sends the data to the system controller 10. Scanning parameters can be input by the input device 5, and stored in a RAM within system memory 11 under the control of the input device controller 17 and the system controller 10. The printer controller 18 controls the printer 6 to print image data from the image memory 14.

Figure 2:
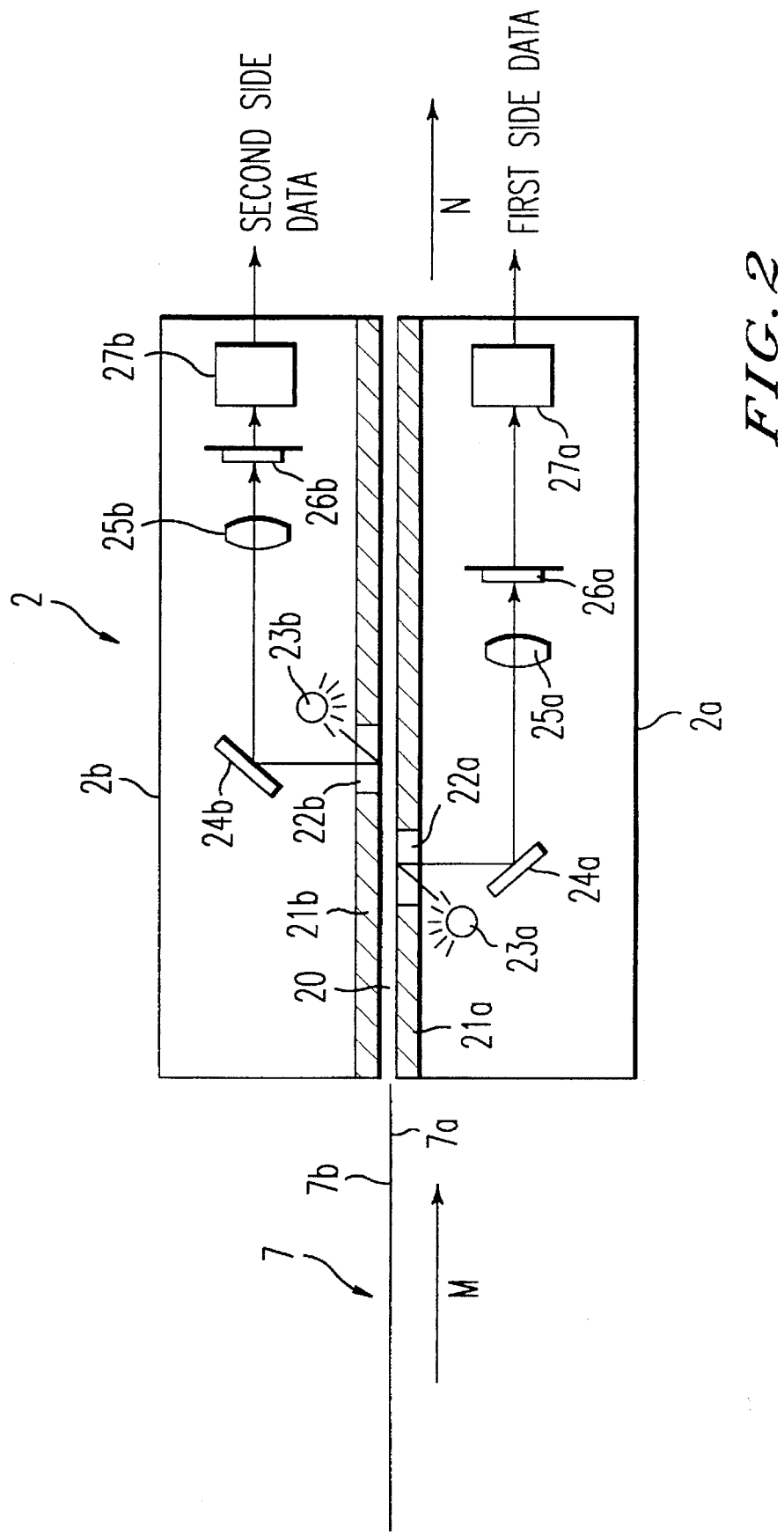
FIG. 2 is a sectional view of a double side scanner according to the invention.

FIG. 2 illustrates a sectional view of a double side scanner 2. A document 7 such as a sheet of paper or business card having double side image data thereon is conveyed in the direction as illustrated by the arrow M. The document 7 is set such that the front side is facing downwardly. A first scanner 2a for scanning front-side data 7a and a scanner 2b for scanning back-side data 7b are located between a feed path 20. After scanning image data, the document 7 is ejected in the direction as illustrated by the arrow N.

The first scanner 2a has a guideplate 21a guiding the front-side data 7a of the document 7. The guideplate 21a has a slit 22a having a width which is the same as the maximum document width. A light source 23a illuminates the surface of side 7a of the document 7 through the slit 22a. Reflected light from the front-side 7a of the sheet is reflected by a mirror 24a through a lens 25a and forms an image on the CCD 26a. The CCD 26a changes the image data to electrical data. The data is converted to binary or multi-value data and stored in a buffer memory 27a.

The second scanner 2b has the same structure as the first scanner 2a. The second scanner 2b has a guideplate 21b guiding the back-side 7b of the document 7. The guideplate 21b has a slit 22b having a width which is the same as the maximum document width. A light source 23b illuminates the surface of side 7b of the document 7 through the slit 22b. Reflected light from the back-side of the document is reflected by a mirror 24b through a lens 25b, and forms an image on the CCD 26b. The CCD 26b changes the image data to electrical data. The data is converted to binary or multi-value data and stored in a buffer memory 27b. The data within the buffer memories 27a and 27b is transferred out of the double side scanner 2 by the image input controller 13 illustrated in FIG. 1. The slits 22a and 22b illustrated in FIG. 2 are offset from each other in order to prevent interference with each other. By offsetting the slits, the back-lighting by one of the lamps 23 will not affect the scanning operation of the scanner on the other side.

The scanner used by the present invention can scan either single sheets of a document or a lengthy continuous document which is in roll form, for example, and passes through the scanner. When the document is lengthy and in roll form, a continuous scanning operation is performed which may be stopped when the end of the document is detected by sensing that the document has been pulled through the scanner or by determining that no additional data is being input by the scanner, for example.

Figure 3:
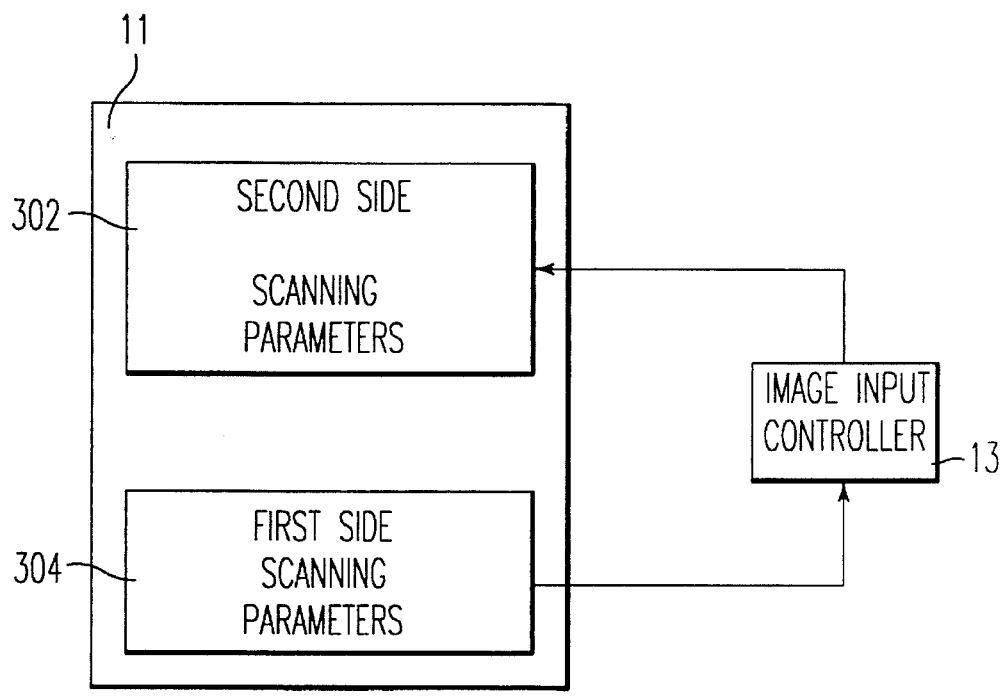
FIG. 3 illustrates how the first side scanning parameters are used in order to generate the second side scanning parameters.

FIG. 3 illustrates a process of sending first side scanning parameters 304 through the image input controller 13 to the second side scanning parameters 302. The first and second side scanning parameters 304 and 302 can be contained within a RAM in the system memory 11. It is possible for the image input controller 13 and/or system controller 10 to perform the copying or transforming of the first side scanning parameters to second side scanning parameters. The parameters for the first side may be copied directly to the second side parameters or alternatively, some may need to be transformed such as margins, as will be explained later.

Figure 4:
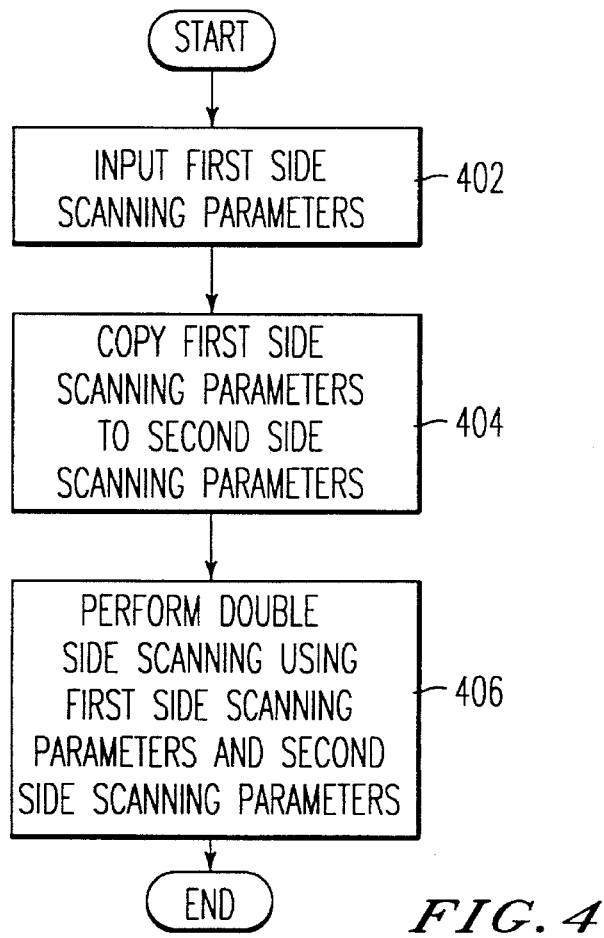
FIG. 4 is a flowchart showing operation of an image input controller according to a first embodiment of the invention.

FIG. 4 illustrates a flowchart showing a first embodiment of the operation of the invention for controlling a double side scanner such as the scanner illustrated in FIG. 2. Step 402 inputs first side scanning parameters. These parameters can be any type of scanning parameters including image composition parameters relating to a monochrome binary specification or a half-tone specification, a darkness, a contrast, a scanning resolution, a compression of the image, the size of the page, page margins, or any other parameter. Step 404 then copies the first side scanning parameters to the second side scanning parameters. In this embodiment, there is no changing of the parameters but they are directly copied from the first side scanning parameters to the second side scanning parameters. Step 406 then performs double side scanning using both the first and second side scanning parameters and the process then ends.

Figure 5:
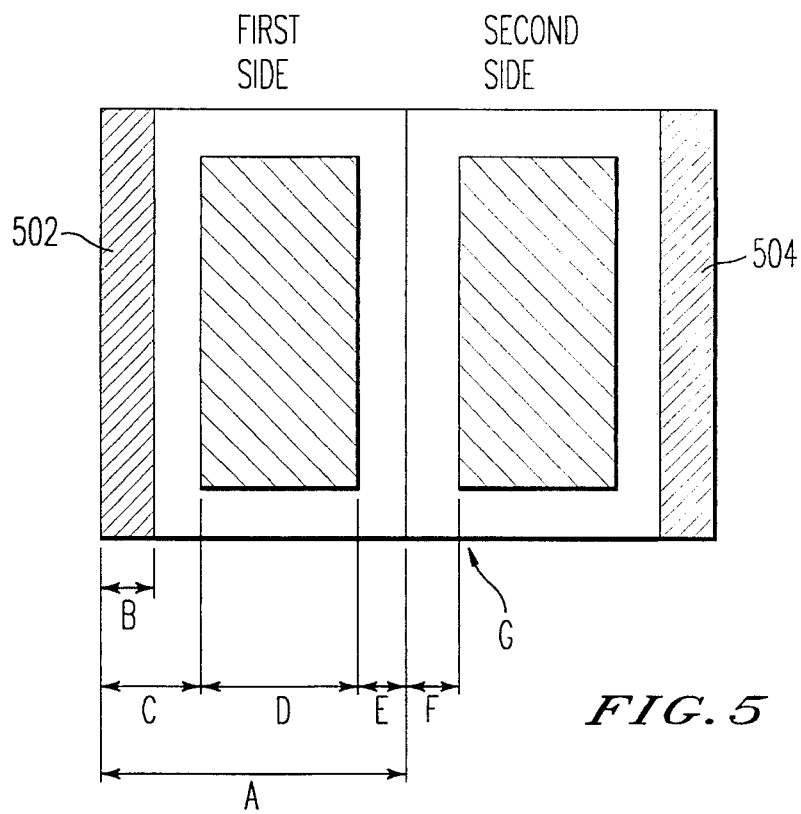
FIG. 5 illustrates the relationship between the first side and second side of a document sheet.

It may not always be possible to directly copy the first side parameters to the second side parameters and it may be necessary to perform changes or transformations to the parameters before they are copied. FIG. 5 illustrates a first side and second side of a page. In this figure, the first side has a binding margin 502 and the second side has a binding margin 504 which are the same size. However, the binding margin 502 of the first side is on the left side of the sheet whereas the binding margin of 504 of the second side of the sheet is on the right side. Accordingly, as can be seen in FIG. 5, the data to be scanned is on different portions of the first side and second side of a sheet.

The parameters which are to be input and define the scanning area of the first side of the sheet are the width of the document A, the width of the binding margin B, the left position of the first side at which the data to be scanned starts which is equal to the width C, and the width of the data to be scanned D.

When scanning the second side, it is necessary to know the width F of the left margin of the second side which is equal to the width E of the right margin of the first side. The width F and the width E can be determined according to the formula $$F=E=A-(C+D).$$

Accordingly, the left margin of the second side can be calculated and the data width of the second side is equal to the data width D of the first side. If the length of the document is entered, the length of the first side is equal to the length of the second side. Accordingly, the present invention is quite advantageous in that the margins and scanning information of the second side can be calculated without having the operator of the scanner enter these parameters.

The sensitivity of the CCD of one side of the scanner may be different from the sensitivity of the CCD Of the other side of the scanner. In order to have the scanning density of each scanner be the same while entering only one scanning density by an operator, the scanning density of the second side can be determined from the set scanning density of the first side by either multiplying the scanning density of the first side by a predetermined constant in order to compensate for the different scanning densities or a value may be added or subtracted from the scanning density of the first side to obtain the scanning density of the second side.

Figure 6:
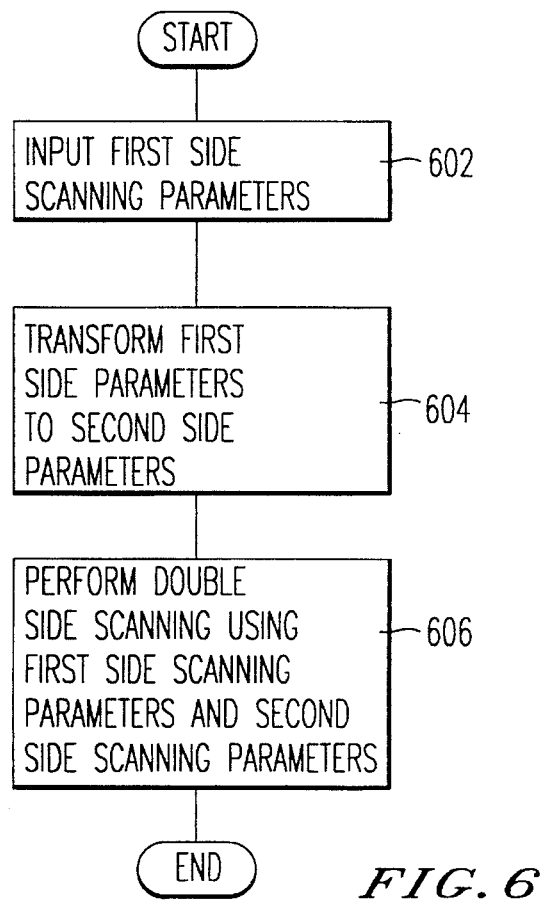
FIG. 6 is a flowchart showing operation of an image input controller according to a second embodiment of the invention.

FIG. 6 illustrates a flowchart of the second embodiment of the invention. This flowchart is similar to the flowchart of FIG. 4 except that some or all of the scanning parameters of the first side may be transformed before being used as second side scanning parameters. In step 602, each of the first side scanning parameters are input. The scanning parameters can be any parameters pertaining to the scanning of a document and can be the scanning parameters described with respect to step 402 of FIG. 4. Step 604 then performs a transformation of one or more of the first side scanning parameters to obtain the second side scanning parameters. For example, the margins for the second side can be determined by using the information input for the first side as described above, or the scanning density for the second side can be determined by the scanning density input for the first side, as described above. Additionally, any of the scanning parameters can be transformed as necessary. Step 606 then performs double side scanning using the first side scanning parameters and the second side scanning parameters after which the illustrated process ends.

Figure 7:
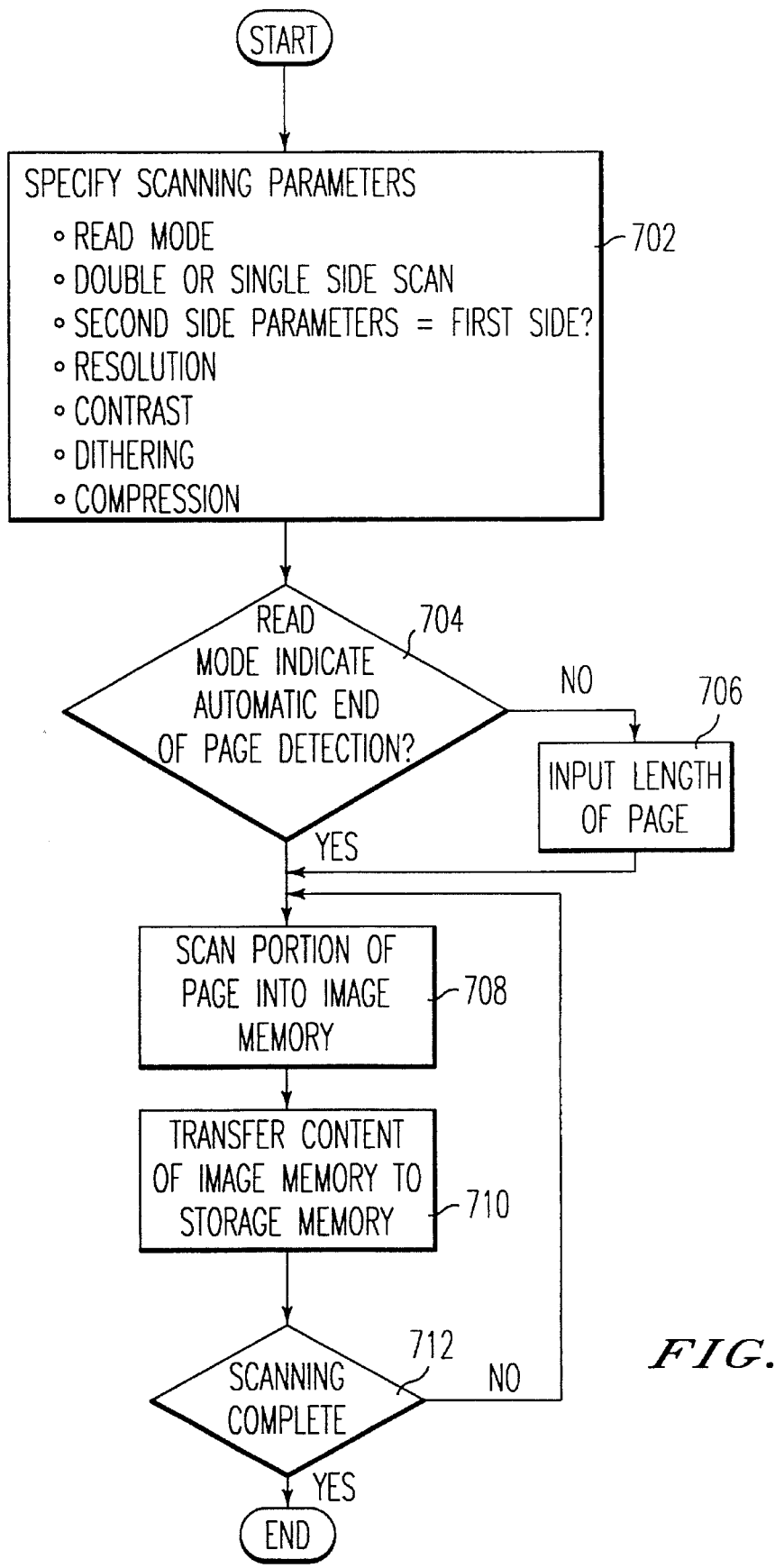
FIG. 7 is a flowchart showing a first scanning procedure.

FIG. 7 illustrates a flowchart showing a scanning procedure of the present invention. Step 702 allows an operator to specify the scanning parameters. The parameters to be specified can be any parameters pertaining to scanning and the following parameters are exemplary and not to be considered limiting. A scanning parameter which is input is the read mode. The read mode indicates whether the page has a definite length or whether the document to be scanned has an undetermined length which is the case when a document is in roll form. If the document has an undetermined length, the scanning can be ended when the document being scanned is no longer present within the scanner (i.e. it is pulled through the scanner) or when no data is detected by the scanner. Alternatively, when the length of a page is known, it is only necessary to scan the known length of the page.

Information can be inputted indicating whether a double or single-side scan is to be performed. If a single-side scan is desired, only parameters pertaining to the first side need to be input. If a double side scan is to be performed, it is possible to determine the second side parameters by the selected first side parameters as described above. If a double side scan is selected, a scanning mode can be set such that various parameters of the first side are either copied or transformed to the parameters of the second side, as desired. For example, in one input mode, all parameters for the second side scanning can be automatically determined but in another mode, it is possible for separate entries for the contrast of each side to be selected. Further, any combination of the parameters for the first side and second side can be input as desired.

The user can specify the resolution of the scan. This can be entered by specifying the number of pixels used for the width and the number of pixels used for the length (e.g. X pixels by Y pixels per inch). It is possible to require the same resolution to be selected for both the length and width (the main scan and sub-scan directions).

Features of the image composition can be selected such as whether the document will use a monochrome binary or half-tone specification. The monochrome binary specification is effective for scanning line drawings or typewritten characters. The half-tone specification is effective for scanning photographic documents. When the half-tone specification is selected, a dither pattern can be selected and used for conversion of the scanned data to a binary format. It is possible to include six dither patterns within the scanner and the user may select one of the six, depending on the desired results. If parameters are being manually input, the user should remember that when selecting a dither pattern, the resolution and tone are in a reciprocal relationship. A threshold value for conversion to monochrome binary from the half-tone specification can be falsely changed by adjusting the contrast.

The compression (i.e. size reduction/enlargement) can be input. The selected data compression can either decrease or increase the storage space needed to store the scanned document. In some cases, compressing the document for dither half-tone processed data may actually increase the amount of data, thereby resulting in a negative compression. The compression modes can be compatible with the CCITT G3/G4 specifications.

Step 704 determines whether the read mode indicates automatic end of page detection. If it does not, the user must input the length of the page in step 706. If the read mode indicates that the end of page is to be automatically detected, the length of the page is not used but a continuous scanning process is performed and the end of the document is detected as described above.

When a continuous scanning operation is performed on a very long document such as a roll-fed document with an indeterminate length, it may be necessary to transfer the contents of the image memory to a non-volatile storage memory such as a hard disk or optical disk to prevent the image memory from overflowing. This transfer allows the reduction in size of the image memory and allows the overall scanning procedure to be sped up as a portion of the image memory may be transferred at the same time as the document is being scanned. However, it is also possible to perform this simultaneous transfer and scanning when an ordinary definite length page is being scanned such as an A4 size page or an 8.5×11 page is to be scanned.

In step 708, a portion of a page is scanned into the image memory. Step 710 then begins a process of transferring the content of the image memory to a storage memory. Step 712 then checks if the scanning process is complete and if it is not, flow returns to step 708 to scan an additional portion of the page into the image memory. It is to be noted that once the image memory contains scanning data, the content of the image memory can be transferred at the same time as a different portion of the page is being scanned into the image memory. When step 712 determines that the scanning is complete, the process of FIG. 7 ends. A manner in which it can be determined if the scanning is complete is to examine the number of bytes of information stored within the image memory. If the image memory is empty, the scanning will be completed. Alternatively, one of the other above-described methods can be used to determine if the scanning is complete. It is to be noted that steps 708–712 can be performed for either single-side or double-side scanning. If double-side scanning is being performed, the loop of steps 708–712 can be simultaneously performed for each of the two sides of the document being scanned.

Figure 8:
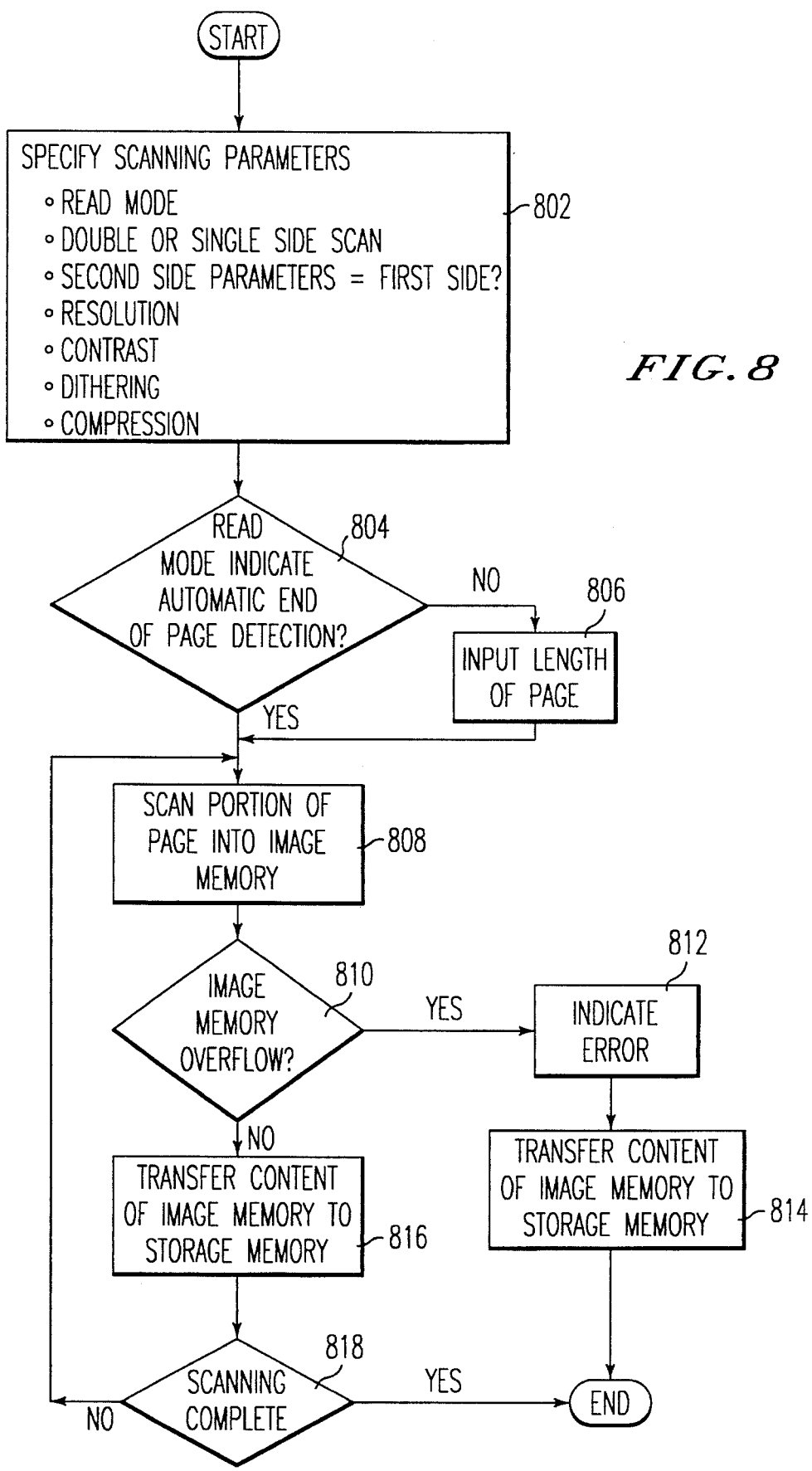
FIG. 8 is a flowchart showing a second scanning procedure.

FIG. 8 illustrates a different manner of performing the scanning of the data into the image memory and transfer from the image memory. Steps 802–806 in FIG. 8 are identical to steps 702–706 of FIG. 7 and a description thereof will be omitted. Steps 808–818 are advantageously performed when the read mode indicates that the end of the page will be automatically detected and the page length is unknown. However, steps 808–818 can also be performed, if desired, when the page length has been input.

Step 808 scans a portion of the page into the image memory. Step 810 determines if there was an attempt to load too much data from the scanning process into the image memory, thus resulting in an image memory overflow. If an image memory overflow was detected in step 810, step 812 indicates an error has occurred by the memory overflow and step 814 transfers the contents of the image memory to the storage memory and the process ends. If step 810 determines that there is not an image memory overflow, step 816 transfers the content of the image memory to the storage memory. If step 818 determines that the scanning process is complete, the process ends. If the scanning process is not complete, flow returns back to step 808 to scan an additional portion of the page into the image memory.

The image memory overflow in step 810 can be detected by determining if there was an attempt to write more bytes of data into the image memory than the image memory can hold. If there is such an attempt, an image memory overflow occurs. It is possible to determine if the scanning is complete using one of the above-described methods. It is also possible to determine that the scanning is complete by calculating the number of bytes necessary to halt the pages being scanned and when those bytes have been loaded into the image memory, the scanning process will be complete as all desired data has been scanned.

Obviously, numerous modifications and variations of the present invention are possible in light of the above teachings. For example, it does not matter whether the first side scanner is the top side scanner or the bottom side scanner. Further, the invention can equivalently operate by inputting the second side parameters and determining the first side parameters using the second side parameters. It is therefore to be understood that within the scope of the appended claims, the invention may be practiced otherwise than as specifically described herein.

What is claimed as new and desired to be secured by Letters Patent of the United States is:

1. A scanning apparatus comprising:

a first scanner for scanning a first side of a sheet;

a second scanner, connected to the first scanner, for scanning a second side of said sheet;

an input device for inputting scanning parameters for said first side of said sheet;

a determining means, connected to the input device, for determining scanning parameters for said second side of said sheet using said scanning parameters for said first side of said sheet; and a controller, connected to said first scanner and said second scanner, for controlling said first scanner and said second scanner using said scanning parameters for said first side of said sheet and said scanning parameters for said second side of said sheet, wherein said scanning parameters for said first side of said sheet include at least one parameter selected from the group consisting of a monochrome binary specification, a half-tone specification, a scanning resolution, a compression specification, a length of said sheet, and a density specification.

2. A scanning apparatus as claimed in claim 1, wherein:

said determining means determines said scanning parameters for said second side of said sheet by copying at least some of said parameters for said first side of said sheet to said parameters for said second side of said sheet.

3. A scanning apparatus as claimed in claim 1, wherein:

said determining means determines said scanning parameters for said second side of said sheet by transforming at least some of said parameters for said first side of said sheet to said parameters for said second side of said sheet.

4. A scanning apparatus as claimed in claim 1, wherein said scanning parameters for said first side of said sheet include the monochrome binary specification.

5. A scanning apparatus as claimed in claim 1, wherein said scanning parameters for said first side of said sheet include the half-tone specification.

6. A scanning apparatus as claimed in claim 1, wherein said scanning parameters for said first side of said sheet include the scanning resolution.

7. A scanning apparatus as claimed in claim 1, wherein said scanning parameters for said first side of said sheet include the compression specification.

8. A scanning apparatus as claimed in claim 1, wherein said scanning parameters for said first side of said sheet include a starting position of scanning, in addition to the at least one parameter selected from the group.

9. A scanning apparatus as claimed in claim 1, wherein said scanning parameters for said first side of said sheet include the length of said sheet.

10. A scanning apparatus as claimed in claim 1, wherein said scanning parameters for said first side of said sheet include the density specification.

11. A scanning apparatus as claimed in claim 1, wherein said sheet is a business card.

12. A scanning apparatus as claimed claim 1, wherein said second scanner has a scanning input positioned after a scanning input of said first scanner in a sheet conveying direction.

13. A scanning apparatus as claimed in claim 1, wherein said scanning apparatus as a facsimile machine.

14. A scanning apparatus as claimed in claim 1, wherein said scanning apparatus as a copier.

15. A scanning apparatus as claimed in claim 1, wherein said scanning apparatus is a digital copier.

16. A scanning apparatus as claimed in claim 1, wherein said scanning apparatus as an electrical filing system.

17. A scanning apparatus as claimed in claim 1, wherein said scanning apparatus is an optical filing system.

18. A scanning apparatus as claimed in claim 1, wherein said scanning apparatus is an electronic mail system.

19. A method for controlling a double side scanning apparatus having a first scanner and a second scanner, comprising the steps of:

inputting scanning parameters for a first side of a sheet;

determining scanning parameters for a second side of said sheet using said scanning parameters for said first side of said sheet;

controlling said first scanner and said second scanner using said scanning parameters for said first side of said sheet and said scanning parameters for said second side of said sheet, wherein said step of inputting scanning parameters for a first side of a sheet comprises inputting said scanning parameters consisting of at least one parameter from the group including a monochrome binary specification, a half-tone specification, a scanning resolution, a compression specification, a length of said sheet, and a density specification.

20. A method as claimed in claim 19, wherein:

said determining step determines said scanning parameters for said second side of said sheet by copying at least some of said parameters for said first side of said sheet to said parameters for said second side of said sheet.

21. A scanning method as claimed in claim 19, wherein:

said determining step determines said scanning parameters for said second side of said sheet by transforming at least some of said parameters for said first side of said sheet to said parameters for said second side of said sheet.

22. A scanning apparatus, comprising:

a first scanner for scanning a first side of a sheet;

a second scanner, connected to the first scanner, for scanning a second side of the sheet;

an input device for inputting a margin for the first side of the sheet;

a determining means, connected to the input device, for determining a margin for the second side of the sheet by using the input margin for the first side such that if the input margin for the first side is a right margin, the right margin for the first side is used as a left margin for the second side, and if the input margin for the first side is a left margin, the left margin for the first side is used as a right margin for the second side; and a controller, connected to the first scanner and the second scanner, for controlling the first scanner and the second scanner using the input and determined margins.

23. A method for controlling a double side scanning apparatus having a first scanner which scans a first side and a second scanner which scans a second side, comprising the steps of:

inputting a margin for the first side of a sheet;

determining a margin for the second side of the sheet by using the input margin for the first side such that if the input margin for the first side of the sheet is a right margin, the right margin for the first side is used as a left margin for the second side, and if the input margin for the first side is a left margin, the left margin for the first side is used as a right margin for the second side; and controlling the first scanner and the second scanner using the input and determined margins.

* * * * *